Feb. 18, 1964     N. S. MELETIOU     3,121,545

ROTARY DEFLECTOR FOR AIRCRAFT ENGINE INTAKES

Filed Jan. 10, 1962

INVENTOR.

Nicholas S. Meletiou

United States Patent Office 3,121,545
Patented Feb. 18, 1964

3,121,545
ROTARY DEFLECTOR FOR AIRCRAFT
ENGINE INTAKES
Nicholas S. Meletiou, Quincy, Mass., assignor to
John J. Moss, Boston, Mass.
Filed Jan. 10, 1962, Ser. No. 165,999
13 Claims. (Cl. 244—53)

The present invention relates to screens and to ribbed deflectors for the air intakes of aircraft engines, and in particular to wind-driven vaned and streamlined rotary deflectors of variable pitch which, mounted over the air intakes of jet engines, deflect undesired foreign matter, such as birds, battle debris, or other matter therefrom, especially heavier-than-air matter, and thus protect the interior of said engines and promote their efficiency and dependability. As has been stated in all parts of the steady stream of newspaper and official comment which has characterized the problem of jet intake protection especially since the starling crash in Boston in the autumn of 1960, the industry has been continuously devoting effort and expense to the development of proper yet economical protective means thus far without success, and airport authorities have been forced to devote thousands of dollars to such primitive and only partly-effective solutions as the posting and changing of armed bird patrols near runway boundaries.

The difficulties with protective apparatus intended for aircraft engine intakes in the present and past art have included complexity and unwieldiness of structure, including the inability of it to be easily mounted in place or removed, great cost, considerable drag at the high air speeds customary, and the susceptibility of such apparatus to the formation thereon of ice which seriously threatens not only the functioning of the engine itself, but, because of the accompanying resulting overheating of the engine and its maintained operation thereat until the ice is removed, the very strength and reliability of the adjacent aircraft structural components and materials. Accordingly, the present invention is directed, among other ends, to meeting these disadvantages of the present and past art. In particular, among its principal objects, as presently conceived are the provision of a meshless, material-saving deflector, of sturdy but simple and relatively light construction, easily and relatively inexpensively manufactured, mounted, and removed for servicing or when otherwise not needed, wind- or motor-driven as desired, capable of varying pitching of its component deflector vanes, as may be determined during flight from the aircraft cockpit or flight deck, of a generally convex over-all shape reinforced at its base by propeller-like fan blades, which will not only not add substantially to the drag of the aircraft but be capable of adding to the thrust and lift thereof in particular embodiments, and having an overall streamlined aerodynamic shape and composed of a set of streamlined aerodynamically-surfaced deflecting vanes operating to deflect heavier-than-air objects away from the protected engine intake at right angles to the direction of motion of the aircraft by centrifugal force resulting from the rotation of the said vanes; or a deflector combining such of the foregoing features as will in the individual case, be most appropriate. Moreover, by constructing the deflector of thermo-conductive material and/or appropriately wiring it or otherwise producing warmth in its vicinity as is well known in the art, further contributions to de-icing or the prevention of icing can be made. The rotation of the deflector during its usual operation is itself a preventative of icing, however. Furthermore, cooling systems known in the art can, if desired, make use of the thermoconductive features both of material and of structure and design found in my device.

These and other objects, features, and advantages of my invention will best appear from a detailed description of my presently-preferred embodiments, illustrated in the accompanying drawings, wherein.

Figure 3:
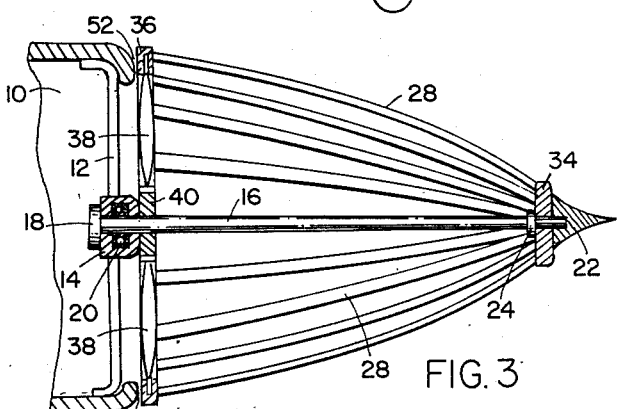
FIG. 3 is a view in cross-section of the deflector shown in FIG. 2, taken along the line 3—3.

Referring now to the drawings, I provide, as shown in FIG. 3, a jet engine nacelle 10, having, secured to its inner wall a spider 12 supporting a bushing 14 in which is mounted for rotation on its axis an axle 16 extending outwardly from said nacelle 10 and concentric therewith. The axle 16 is prevented from moving along its axis by an inward end head 18 and a key 20, which are formed integrally on or fixedly secured to it and which, between them, abut respective surfaces of the bushing 14, which is thus locked or locks on that portion of the axle 16 lying between the said inward end head 18 and key 20.

Figure 4:
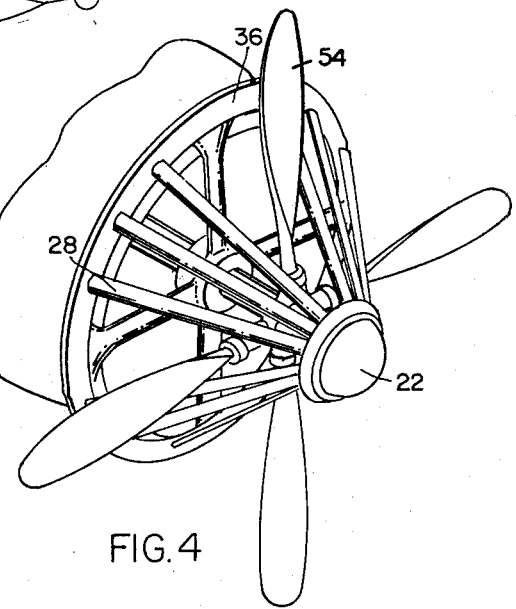
FIG. 4 is a view in perspective of an alternative embodiment of my deflector, shown in use on a propeller-driven aircraft.
Figure 5:
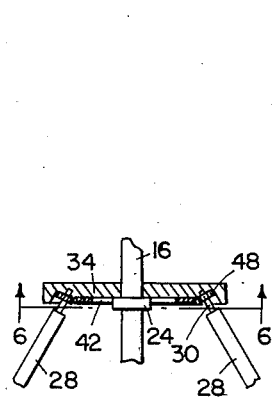
FIG. 5 is a side view partly broken away of the head of my deflector, showing a conventional form of pitch varying mechanism employed to position the deflector vanes.
Figure 6:
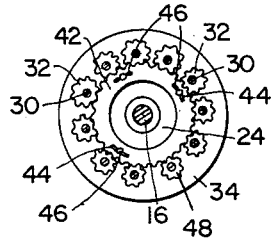
FIG. 6 is a rear view in section of the pitch-varying deflector head mechanism shown in FIG. 5, taken along the line 6—6.

At its outward end the axle 16 is fixedly secured to a spinner 22 and a bracing flange 24 spaced inwardly therefrom along said axle 16, having conventional selsyn or mechanical means (not shown) operable from the cockpit 26 of the aircraft for controlling, as will hereafter be described, the pitch of a plurality of deflector vanes 28 rotatably mounted by means of spindles 30 in sockets 32 adapted to receive them, circumferentially arranged respectively in a hub 34, as shown in FIGS. 3, 5, and 6, and in a rim 36, as shown in FIGS. 2, 3, 4, and 7, said hub 34 and said rim 36 being preferably fixedly secured to said axle 16 for rotation therewith. The rim 36 may, as in FIGS. 2 and 3, be braced by propeller blades 38 which act as spokes thereof connecting said rim 36 to a central disk 40 which is affixed rigidly to said axle 16.

The hub 34 supports on its inward side, as shown in FIGS. 5 and 6, a central disk gear 42 having arcuate slots 44 and mounted on said hub 34 for restricted angular movement with respect thereto by pins 46. Integrally formed with or rigidly fixed to the spindles 30 are respective circumferentially-arranged disk gears 48 positioned to engage the central disk gear 42. It is this gear 42 which supports the selsyn or mechanical pitch control means (not shown) previously referred to in connection with the variable pitching of the deflector vanes, 28, as is well known in the propeller blade pitching art. By this known selsyn or other remote control device operable from the cockpit 26 as stated, the central disk gear 42 is, when desired, rotated a predetermined angular distance, which, by means of the gears 48, rotates the deflector vanes 28 a related predetermined uniform angular distance depending on the relative circumferences of the respective engaging gears 42, 48, thus varying the pitch of the vanes 28 with respect to the airstream.

Figure 1:
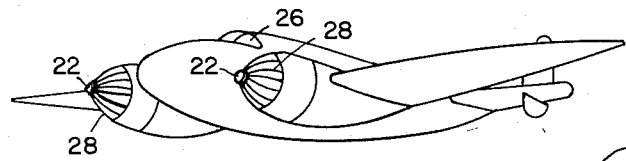
FIG. 1 is a view in perspective of a jet aircraft in flight, showing the outward appearance of my present invention when in normal use.
Figure 2:
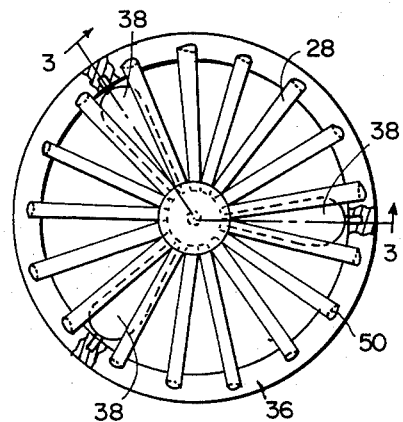
FIG. 2 is a front view of either of the deflectors shown in FIG. 1.

The vanes 28 have each an aerodynamically streamlined cross-section as indicated at 50 in FIG. 2, such that the resultant of the thrust and lift developed from their rotation by the airstream, in a preferred embodiment, exceeds the drag thereby developed. In a further alternative embodiment (not shown) the variable pitch control system defined above is further modified by being equipped with one or more gyroscopes and associated gearwork and circuitry within the skill of a compenent mechanic or electrician, whereby the several vanes 28 are given an automatically and continuously varying pitch, the angle thereof being proportioned to the varying airspeed of the aircraft, in order to obtain maximal lift and efficiency. The vanes 28 themselves are made of any tough, hard, and light material, the strength characteristics depending in part on the anticipated speed of the aircraft and in part on the mean mass of the largest limiting objects intended to be deflected. Aluminium or a hard plastic seem among the preferable materials, but woods of certain kinds or wood products, and other metals, are not excluded.

In actual operation of my invention, the aircraft is flown as usual, the deflector being mounted over the engine nacelles 10 so that the rim 36 overlaps the nacelle openings as shown in FIG. 3 at 52. The air entering the nacelle 10 hits the pitched vanes 28 and the propeller blades 38 and rotatably drives the deflector as a fan, or pinwheel. That part of the airstream which does not enter the deflector and thereby the engine, rolls, slips, and spills smoothly along a streamlined surface of revolution formed by the now rapidly rotating deflector extending rearwardly from the streamlined spinner 22 substantially fairing into the outer surface of the nacelle 10 by means of the longitudinal curvature of the vanes 28. See FIG. 3, especially.

Because of the pitching, sectional airfoiling, and spacing of the vanes 28, they present substantially no obstacle to entry of air into the nacelle 10. The pitching also contributes to the rotational speed of the deflector, and thereby to the ability of the vanes to slice or shred colliding matter while deflecting it centrifugally, or, if the flat of the vanes 28 have encountered the colliding matter, to bat the same immediately away from the aircraft at right angles to its line of flight. Of course, the forward motion of the aircraft itself adds to these effects. If desired, conducting wires or other heating means may be installed about the vanes 28, whether the said vanes 28 are themselves made of thermoconductive material or not, to prevent nacelle or deflector icing at high altitudes or in precipitous weather or cold seasons; or the vanes 28 may be pitched to blow cooling air into the engine while screening out foreign matter.

In the alternative embodiment shown in FIG. 4, the axle 16 is an extension of the propeller drive shaft in a conventionally-propellered aircraft, and thus is rotated by the aircraft engine and not by the airstream. Propeller blades 54 are shown projecting laterally through the deflector between predetermined pairs of the vanes 28; and of course said blades 54 serve deflecting and chopping functions themselves with respect to foreign matter encountered in flight. The deflector vanes 28 may, however, be variably pitched as previously described.

Figure 7:
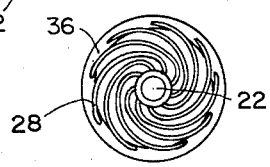
FIG. 7 is a front view of a third embodiment of my deflector, shown on a smaller scale than the views in FIGS. 2 through 6 inclusive.

In the embodiment shown in FIG. 7, the vanes 28 have respective cambered pitches, which may be permanent if desired, so that some part of each vane 28 will always be at optimal flying pitch without the necessity for complex or weighty automated circuitry or adjusting mechanisms.

The rotation of the deflector may also be accomplished by the creation of a suction draft through appropriate and known suction means (not shown) placed in the interior of the nacelle 10 or further within the aircraft, as is known in the art. To the extent that said suction means (not shown) is controlled as to the strength of its draft, or is reversible as to direction, the rotary speed of the deflector is also controlled.

Said suction means, in one presently-preferred embodiment exhibiting this feature, consists in a conventional vacuum pump (not shown) powered by a conventional gas turbine engine (not shown) located at any convenient place within the aircraft, said pump being fixed in the interior of the nacelle 10 rearwardly of the spider 12 (referring to FIG. 3) and positioned to induce an airflow rearwardly past said spider 12, which airflow will turn the blades 38 and thereby spin the vanes 28 on their axle 16 (or with said axle 16 in the embodiment shown where that also rotates with respect to the nacelle 10).

It will be understood that my invention is not to be construed as limited by the foregoing words and embodiments precisely, but is instead intended to be broadly protected as disclosed herein and as embodied in such further modifications as will now be apparent to those skilled in the art, and also as defined by a liberal interpretation of the appended claims.

I claim:

1. A rotary deflector for aircraft engine intakes, comprising: an axle extending outwardly from the nacelle of an aircraft engine, supported thereon by means; a spinner at the outer end of said axle; a bracing flange inwardly spaced therefrom on said axle; a hub mounted on said axle between said spinner and said bracing flange; a rim mounted on said axle a predetermined distance from said nacelle, lapping said nacelle laterally; and a plurality of deflector vanes circumferentially supported on said rim and said hub, said vanes converging longitudinally and radially toward said hub, said rim, hub, and associated vanes being thereby rotatably mounted on said aircraft engine nacelle with respect thereto and being adapted to be driven at a predetermined angular speed for deflecting from said nacelle substantially all matter external to the aircraft within a predetermined size and mass range coming in contact with said vanes.

2. An aircraft engine intake deflector, as defined in claim 1, further characterized by said axle-supporting means being a bushing.

3. The rotary deflector for aircraft engine intakes defined in claim 1, further characterized by said axle-supporting means being a spider.

4. The rotary deflector for aircraft engine intakes defined in claim 1, further characterized by said axle having fixedly secured to itself near its inward end a head and key for locking it in fixed longitudinal position with respect to said nacelle.

5. The rotary deflector for aircraft engine intakes defined in claim 1, further characterized by said rim, hub, and associated vanes being fixedly mounted on said axle for rotation therewith, said axle being rotatably mounted on said nacelle, though longitudinally fixed with respect thereto.

6. A rotary deflector for aircraft engine intakes as defined in claim 1, further characterized by said deflector vanes having predetermined pitches variable during flight from the cockpit.

7. The rotary deflector for aircraft engine intakes defined in claim 1, further characterized by said deflector vanes having cambered pitches.

8. The rotary deflector for aircraft engine intakes defined in claim 1, further characterized by said deflector vanes having permanent pitching.

9. The rotary deflector for aircraft engine intakes defined in claim 1, further characterized by said vanes being supported by propeller blades rotatably mounted with respect to said nacelle, said blades having a plane of rotation substantially perpendicular to said axle, said blades being rotatable by contact with air passing through said nacelle.

10. The rotary deflector for aircraft engine intakes defined in claim 1, further characterized by said deflector vanes having longitudinal aerodynamically shaped surfaces and cross-section outlines.

11. The rotary deflector for aircraft engine intakes defined in claim 1, further characterized by said deflector vanes having transverse aerodynamically shaped surfaces and cross-section outlines.

12. The rotary deflector for aircraft engine intakes defined in claim 1, further characterized by said deflector vanes being adapted to be driven rotatably by a source of power selected from the group comprising the following members: the airstream; a motor connected to said vanes; and suction means located in the aircraft inwardly from said deflector vanes.

13. The rotary deflector for aircraft engine intakes defined in claim 12, further characterized by said source of power being suction means of variable and reversible suction force, adapted to controllably vary the angular speed and direction of said vanes, said suction means being operable and variable from the cockpit.

References Cited in the file of this patent
UNITED STATES PATENTS

| | | |
|---|---|---|
| 2,347,153 | Hagen et al. | Apr. 18, 1944 |
| 2,680,345 | Frost | June 8, 1954 |
| 3,021,669 | Nye | Feb. 20, 1962 |